United States Patent [19]

Baron et al.

[11] Patent Number: 4,465,337

[45] Date of Patent: Aug. 14, 1984

[54] REDUCED REFLECTIVITY MEMBER AND ION IMPLANTATION METHOD OF FABRICATION

[75] Inventors: Moshe I. Baron; Ram Kossowsky, both of Pittsburgh, Pa.

[73] Assignee: Westinghouse Electric Corp., Pittsburgh, Pa.

[21] Appl. No.: 355,072

[22] Filed: Mar. 5, 1982

[51] Int. Cl.³ .......................... G02B 1/10; B05D 3/06
[52] U.S. Cl. .................................. 350/164; 350/163; 250/492.3; 427/38; 427/162; 427/164
[58] Field of Search .................. 350/163, 164; 315/111.81; 250/492.3; 427/38, 162, 164

[56] References Cited

U.S. PATENT DOCUMENTS

| | | | |
|---|---|---|---|
| 2,344,250 | 3/1944 | Jones | 350/164 |
| 2,702,863 | 2/1955 | Koch | 250/492.3 |
| 4,258,266 | 3/1981 | Robinson et al. | 250/492 A |
| 4,262,056 | 4/1981 | Hubler et al. | 350/1.7 |
| 4,274,004 | 6/1981 | Kanai | 250/442 |

*Primary Examiner*—John K. Corbin
*Assistant Examiner*—William Propp
*Attorney, Agent, or Firm*—W. G. Sutcliff

[57] ABSTRACT

An improved minimum light reflectivity, light transmissive vitreous member and method of fabrication in which an ion implanted, buried ion phase layer is provided within the light transmissive member closely spaced from the light output surface. This buried phase layer has an index of refraction greater than the index of refraction of the vitreous member such that the optical impedance of the buried phase layer and the vitreous material are closely watched to minimize reflectivity from the light output surface of the vitreous member.

7 Claims, 2 Drawing Figures

REDUCED REFLECTIVITY MEMBER AND ION IMPLANTATION METHOD OF FABRICATION

BACKGROUND OF THE INVENTION

The present invention relates to optical transmission members, and more particularly to members with minimized reflectivity. In a specific embodiment, the present invention relates to an improved glass faceplate of an image display cathode ray tube and a method of fabrication of such a glass faceplate with a minimized reflectivity. The invention finds general application with any optical member where the reflectivity is to be minimized.

The desirability of minimizing reflectivity from an optical surface is generally recognized, and particularly for image display devices which are utilized in high ambient background light. Thus, the present invention can be applied to a wide variety of optical members such as mirrors and lenses, and more specifically to image display cathode ray tubes, such as are used for instrumentation in aircraft cockpit displays. The basic phenomenon of reflectivity degrades the resolution and brightness of the displayed optical image or optical output as a result of the difference in indices of refraction at the interface between the optical member and air through which the image is displayed is viewed. It has been the practice to utilize antireflective surface coatings on such optical members. For vitreous glass faceplates, such as used in cathode ray display tubes, the most widely used antireflective coating is magnesium fluoride which is typically vapor or sputter deposited onto the glass surface at a high deposition temperature. The antireflective magnesium fluoride film thickness is controlled optically using light transmission or reflection from the member which is being coated. The typical vitreous glass faceplate has an index of refraction of about 1.5, and the index of refraction of magnesium fluoride is about 1.38, so that it is not entirely possible to impedance match the antireflective coating with the glass substrate member. A typical reflectivity from an uncoated optical member is about 4%, and the typical reduction in reflectivity had from antireflective coatings reduces the reflectivity to about 1% or greater.

The physical principles underlying the operation of single layer antireflective coatings are well-known and rely on destructive interference of reflected light waves from a system consisting of glass coated with a quarter wavelength antireflective coating, wherein the index of refraction of the coating is lower than that of the glass. For a theoretical impedance match the desired condition is index of refraction of the coating should equal the square root of the index of refraction of the glass. Materials simply do not exist which can meet this impedance matching requirement both with respect to the index of refraction for typical vitreous materials friom which optical members are formed, or with respect to the low index of refraction required of the antireflective coating material.

The most widely used antireflection material, magnesium fluoride while more resistant to environmental degradation than alternative coatings is still subject to scratching, or wearing as by oxidation or hydrolysis of the coating when exposed to the environment and to ultraviolet radiation. Other lower index of refraction materials such as sodium and potassium fluoride are less chemically stable and more easily physically damaged due to lack of mechanical strength.

The use of multiple layers of magnesium fluoride as a multiple layer antireflective coating has been used in attempts to further impedance match the multiple coatings to the optical substrate. However, such multiple coatings are costly and difficult to fabricate. A general review of the field of optical coating technology can be found in "Optical Coatings I, II, from the S.P.I.E. Proceedings in Vol. 50, 1975; and the S.P.I.E. Proceedings Vol. 140, 1978."

A recent innovation has been the use of ion bombardment or ion implantation to alter the surface or near surface regions of a variety of materials. Such an ion implanter as can be used in the semiconductor industry is set forth in U.S. Pat. No. 4,274,004, and U.S. Pat. No. 4,258,266. In general, such ion implantation systems direct a high energy stream of ions at a target which is typically disposed in a vacuum, with collisions of the ions with the target surface being such that the ions actually tunnel into or are implanted into the target material.

SUMMARY OF THE INVENTION

An improved minimum light reflectivity, light transmissive vitreous member and method of fabrication is described in which an ion implanted, generally uniform thickness layer buried ion phase layer of selected material is deposited at predetermined distance within the vitreous member. This buried ion phase layer is deposited below the light output surface of the vitreous member, and the layer is spaced generally parallel from the light output surface. This buried ion phase layer has a predetermined thickness and an index of refraction which is greater than the index of refraction of the vitreous material, such that the optical impedance of the buried ion phase layer and the vitreous material are closely matched.

Thus, instead of impedance matching by depositing a layer of appropriate thickness and lower index of refraction as a coating on the surface of an optical member, the present invention utilizes an ion beam to implant a buried ion phase layer within the glass member or vitreous member forming a buried ion phase layer which has an index of refraction which is higher than that of the vitreous member. The spacing of the buried ion phase layer from the optical output surface and the thickness of the buried ion phase layer is controlled by the ion beam characteristics to optimum optical impedance matching.

DETAILED DESCRIPTION OF THE INVENTION

Figure 1:
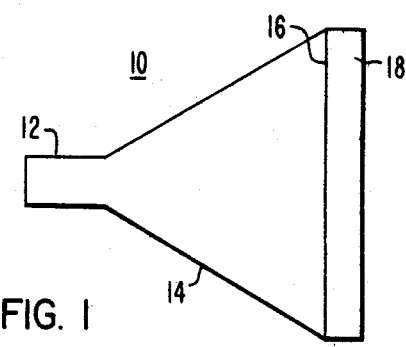
FIG. 1 is a general illustration of an image display cathode ray tube.

The present invention can be illustrated by reference to an image display cathode ray tube 10 such as seen in FIG. 1. The image display cathode ray tube 10 has a neck portion 12 containing electron gun means not shown, which direct an electron beam through the enlarged funnel portion 14 of the tube, to impact upon a phosphor display screen 16, disposed on the interior surface of the faceplate 18 of the tube 10. High levels of ambient light such as from sunlight directed onto the faceplate produce multiple reflections from the faceplate surface which make it very difficult to view the display image which is generated by the phosphor screen 16 on the interior surface of faceplate 18.

Figure 2:
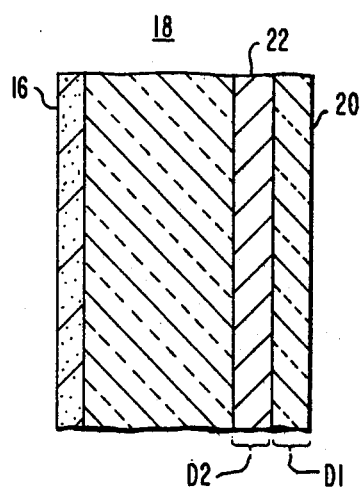
FIG. 2 is a highly enlarged cross-sectional representation of the optical faceplate portion of the cathode ray tube seen in FIG. 1.

In a greatly enlarged representation of the faceplate 18 seen in FIG. 2, a conventional phosphor screen 16 is seen disposed on the tube interior side of the faceplate 18. The optical output surface 20 is the faceplate surface upon which ambient light impacts, and through which the viewer sees the displayed image from the phosphor screen. The index of refraction of a typical vitreous material glass faceplate is about $n=1.5$. A buried ion phase layer 22 of a predetermined thickness $D_2$ is disposed within the faceplate member and spaced by uniformed distance $D_1$ from the optical output surface 20 of the faceplate 18. This buried phase ion layer 22 is formed by ion implanting ions such as aluminum or titanium into the vitreous material through the optical output surface 20 at a controlled voltage and ion fluence. It is believed that the aluminum and titanium ions replace silicon ions in the vitreous faceplate by ion exchange and form an equilibrium stoichiometric phase oxide such as $Al_2O_3$ for implanted aluminum ions, and $TiO_2$ for implanted titanium ions.

For the enlarged faceplate cross section seen in FIG. 2, it can be shown that when air is the ambient medium, that impedance matching will be optimized at a wavelength $\lambda_0$ if:

$$N_1 D_1 = \lambda_0/4$$

wherein $N_1$ is the index of refraction of the vitreous faceplate and $D_1$ is the distance between the optical output surface and the buried ion phase layer, and from the above it can be shown that $$N_2 D_2 = \lambda_0/4$$

and finally that $$N_2 = D_1/D_2 N_1$$

where $N_2$ is the index of refraction of the buried phase and $D_2$ is the thickness of the buried phase. These equations imply that the index of refraction of the buried phase must be $N_1^{3/2}$, and therefore the index of refraction of the buried phase must be larger than that of the vitreous medium. It can also be appreciated from the above equations that the buried ion phase must extend over a thickness of $$D_2 = \lambda_0/4 N_2$$

which is approximately equal to 770 angstroms for impedance matching for peak green output wavelength $\lambda_0$ of 5500 angstroms. The index of refraction of $Al_2O_3$ is approximately equal to 1.785, and the thickness of glass $D_1$ from the output surface to the buried phase layer 22 to minimize reflection is given by $$D_1 = \lambda_0/4 N_1 = 937 \text{ angstroms}$$

The above analysis of the preferred embodiment demonstrates that a buried ion phase can be formed within a vitreous optical member and the reflectivity from the surface of the optical member can be minimized when the buried ion phase layer has a higher index of refraction than that of the vitreous member or substrate, and that such a buried ion phase can be formed by an ion implantation technique. The optical property of the buried ion phase layer can be controlled by the process variables such as the chemical nature of the implanted ion which controls chemical nature of the buried phase formed within the vitreous member, and also by controlling the energy and flux of the implanted ion which controls the optical dimensions involved in the thickness of the buried phase. Ion implantation energies of from about 50 to about 200 kev can be utilized with an ion fluence of about $10^{16}$ to $2 \times 10^{17}$ ions per square centimeter. The use of aluminum ions which are implanted to form aluminum oxide buried ion phase layer produces a buried phase layer with an index of refraction of about 1.785. The use of titanium ion as the implanted ion and a buried ion phase layer of titanium dioxide will exhibit an index of refraction of about 2.16 so as to be usable with vitreous optical members having a higher index of refraction than the normal faceplate glass.

Ion implantation of aluminum has been carried out at implantation or ion acceleration energies of about 50 kev and ion concentrations of $7.5 \times 10^{16}$ ions per square centimeter to $1.25 \times 10^{17}$ ions per square centimeter, and have yielded significantly reduced reflectivity compared to untreated glass. Titanium ions have been implanted at ion implantation energies of about 100 kev with an ion concentration level of $4 \times 10^{16}$ titanium ions per square centimeter, and significantly reduced reflectivity has been provided compared to an untreated glass member.

A significant advantage of the reduced reflectivity member produced for the present invention is that the vitreous optical output surface is unaltered and such vitreous surfaces are well known to be resistant to environmental attacks such as from high temperatures and humidity and ultraviolet radiation. The vitreous member thus plays the role of an antireflective coating with respect to the buried ion phase layer formed for the present invention. The aluminum and titanium ions are described by way of example. The implanted ion is selected to replace silicon atoms in the vitreous optical member, and to form a transparent or light transmissive guide having a refractive index higher than that of the vitreous optical member.

The glass or vitreous optical member may need to be annealed at temperatures of 200°–500° C. to treat any localized damage caused by the implanted ions, or to stabilize the implanted buried ion layer.

We claim:

1. A light transmissive vitreous member having minimum light reflectivity from a light output surface, which vitreous member has a first index of refraction for the vitreous material of the member, and wherein an ion implanted, generally uniform thickness layer of buried ion phase of selected material is disposed a predetermined distance within the member below the light output surface, which layer is generally parallel to the light output surface, and which layer has a predetermined thickness and an index of refraction which is greater than the index of refraction of the vitreous material such that the optical impedance of the buried ion phase layer and the vitreous material are closely matched.

2. The light transmissive vitreous member set forth in claim 1, wherein the implanted ion is aluminum or titanium, and the respective buried phase layer is aluminum oxide or titanium dioxide.

3. The light transmissive vitreous member set forth in claim 1, wherein the product of the thickness of the buried phase layer and its index of refraction is approximately equal a quarter of the wavelength of the light being transmitted.

4. The light transmissive vitreous member set forth in claim 1, wherein the member is a faceplate of a cathode ray display tube, with a phosphor screen disposed in the tube interior side of the faceplate, and wherein the buried phase layer is closely spaced from the tube exterior surface.

5. A method of minimizing the reflectivity from the light output surface of an optically transmissive member comprising a material having a first index of refraction, which method comprises:

ion implanting a selected ion which forms a buried phase layer at predetermined distance below the light output surface, which buried phase layer is generally parallel to the light output surface, and which buried phase layer has an index of refraction which is greater than the index of refraction of the optically transmissive material and is selected such that the optical impedance of the buried phase is closely matched to that of the optically transmissive material.

6. The method set forth in claim 5, wherein the ion selected, the ion fluence, and ion beam energy are selected to implant a buried phase layer of a thickness $D_2$ approximately equal to $$D_2 = \lambda_0/4N_2,$$

where $N_2$ is the index of refraction of the buried phase layer, and $\lambda_0$ is the wavelength of light transmitted.

7. The method set forth in claim 6, wherein the buried phase layer is spaced from the light output surface by the dimension $$D_1 = (\lambda_0/4N_1),$$

where $N_1$ is the index of refraction of the optically transmissive member and $\lambda_0$ is the wavelength of light transmitted.

* * * * *